May 28, 1968  H. D. VAN SCIVER II  3,385,744
BONDING WITH EPOXY RESIN ADHESIVES IN TWO OR MORE CURING RATES
Filed June 22, 1967
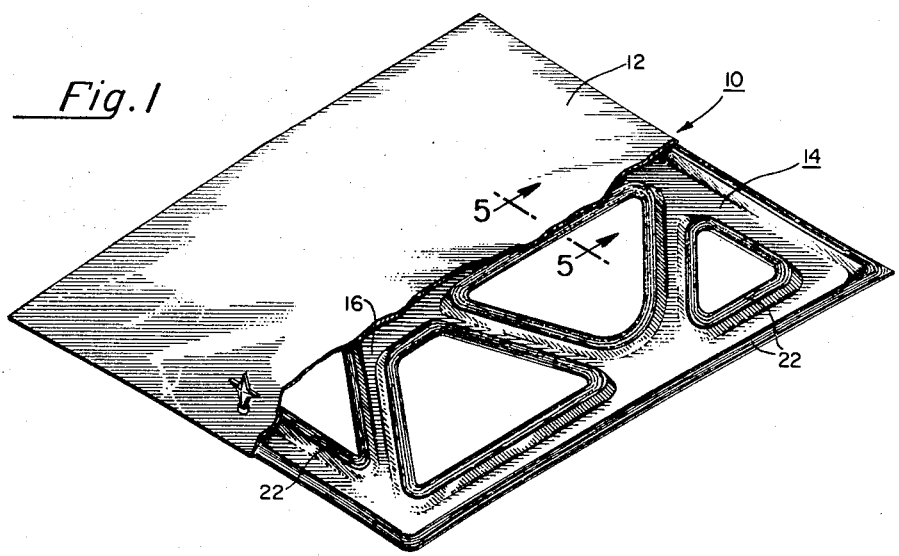
Fig. 1
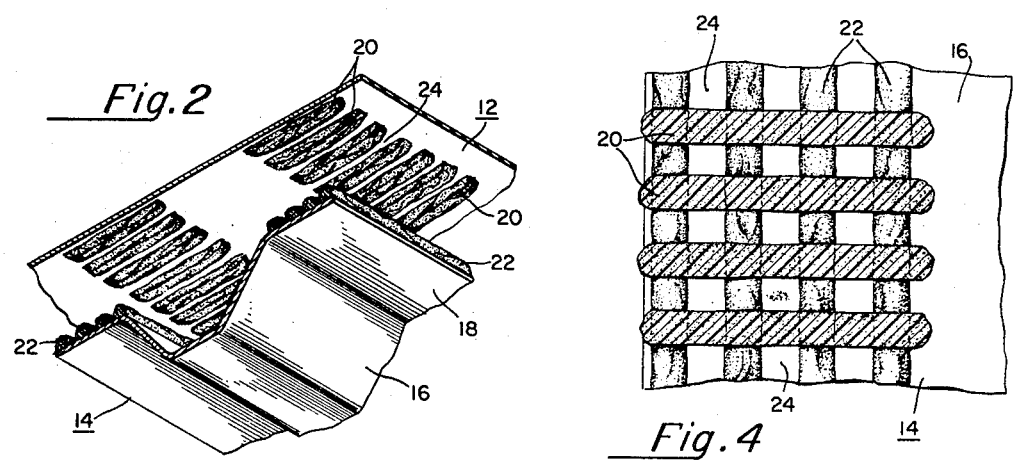
Fig. 2
Fig. 4
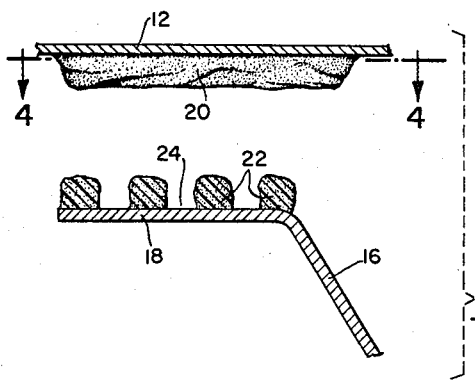
Fig. 3
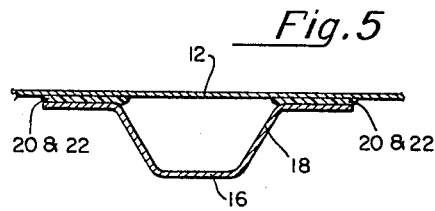
Fig. 5
INVENTOR.
HERBERT D. VANSCIVER II
BY
*A. L. Truex, Jr.*
ATTORNEY

United States Patent Office 3,385,744
Patented May 28, 1968

1

3,385,744
BONDING WITH EPOXY RESIN ADHESIVES IN
TWO OR MORE CURING RATES
Herbert D. Van Sciver II, Merion, Pa., assignor to The
Budd Company, Philadelphia, Pa., a corporation of
Pennsylvania
Continuation-in-part of application Ser. No. 220,794,
Aug. 31, 1962. This application June 22, 1967, Ser.
No. 648,137
4 Claims. (Cl. 156—310)

ABSTRACT OF THE DISCLOSURE

A production method of joining metal stampings by means of epoxy resins for eliminating surface imperfections caused by welding. The method comprises the steps of applying an epoxy resin mixed with a thixotropic agent to a first workpiece in parallel rows, applying a compatible hardener mixed with a thixotropic agent in parallel rows substantially at right angles to the epoxy resin to a second workpiece, joining the workpieces and mechanically intermixing the epoxy resin and hardener, holding the workpieces until the epoxy resin sets, and then releasing the joined workpieces.

---

This application is a continuation-in-part of my copending application, "Production Method of Adhesive Bonding," Ser. No. 220,794, filed Aug. 31, 1962, now abandoned.

This invention relates to adhesive bonding and more particularly to a production method of adhesive bonding two metal stampings of an automobile together to avoid surface imperfections.

The upper body of an automobile commonly referred to as the balloon, is assembled from stamped metal sheets which are welded together usually by resistance spot welding. A conventional steel body is joined together by hundreds of individual spot welds which enables rapid permanent assembly on a production line basis.

Heretofore, resistance welding of two or more stampings such as those which comprise the trunk deck, the hood, the doors, and in some cases the side panels of commercial vehicles of necessity require the joining of two metal stampings at an area which is exposed to view. A conventional resistance weld at the exposed areas causes a heat dimple or slight indenture at the point where the resistance weld is made. In order to prevent the appearance of these welding dimples showing through the paint of a finished automobile it has heretofore been the practice to hand finish or surface grind the exterior metal stamping to reduce the surface surrounding the dimple and thus conceal the appearance of welding dimples.

It has been suggested that two metal stampings could be bonded together with an adhesive placed intermediate joined metal stampings, but the best adhesives presently available having sufficient strength to replace resistance welds have been epoxy adhesives which are slow curing, thus, are not applicable for rates of high production. Although fast curing adhesives are available it has been impossible heretofore to apply such adhesives in a premixed state and still allow time for applying the adhesive, then orienting and assembling two or more stamped metal sheets in abutting relationship.

Therefore, it is a general object of the present invention to provide a production method for adhesive bonding two workpieces together so that the adhesives start curing after the workpieces are assembled.

It is a further object of the present invention to provide a novel method of applying an adhesive to one workpiece and a hardener to another workpiece so that the adhesive is mixed when the workpieces are assembled.

2

It is a further object of the present invention to provide a method of step-curing adhesives at different curing rates.

It is another object of the present invention to provide a method of adhesive bonding stamped metal sheets together by application of adhesives having different curing rates to the interface of abutting stamped metal sheets.

Other objects and advantages of the method and the manner in which they are obtained will become evident from the description when read in connection with the drawings which follow:

FIG. 1 is a perspective view of a typical two piece automobile hood with part of the outer metal stamping removed;

FIG. 2 is an enlarged perspective of a joint showing the orientation of two stamped metal workpieces prior to assembly;

FIG. 3 is an enlarged section of the joint or FIG. 2 further illustrating the orientation of the joint and the adhesive;

FIG. 4 is a section taken at lines 4—4 of FIG. 3, showing the orientation of adhesive on the workpieces;

FIG. 5 is an enlarged section taken at lines 5—5 of FIG. 1 showing the assembled workpieces.

Referring now to FIGS. 1 and 2 showing a typical automobile hood 10 comprising an outer skin sheet 12 made from a metal stamping and an inner skin sheet 14 formed and blanked from a metal sheet to provide reinforcement for the outer skin sheet. It is common practice to fold the edges of outer skin sheet 12 over and around the inner skin sheet 14 to provide a clinched edge around the periphery of the hood 14. If no connection is provided inside the periphery of the hood, sheets 12 and 14 tend to vibrate or drum. Inner skin sheet 14 is formed as a hat section 16 to provide a rigid structural member for reinforcing outer skin sheet 12. If the flange 18 of the hat section 16 is welded directly to the outer skin sheet a depression will be left in outer skin sheet 12 requiring a finishing operation to smooth the outer surface. Also, if inner skin sheet 14 is to be welded to outer skin sheet 12 the two metal stampings must have very precise mating contours or the outer skin sheet will be deformed to take the contour of the inner reinforced skin sheet.

As shown in FIGS. 2 to 4, rows of resin adhesive 20, such as bisphenolepichlorohydrin are applied to the inner face or underside of the outer skin sheet and rows of catalytic hardener 22 such as boron trifluoride or reactive hardener such as diethylenetriamine are applied to the inner face of the flange 18 of the inner skin sheet 14. In the embodiment shown, both the resin and hardener are thickened by the addition of a thixotropic agent such as pure silica, so that the rows of materials 20 and 22 remain sufficiently firm to avoid flowing together and covering the bare metal spaces 24 between the rows. Also in this embodiment the thixotropic agent was selected so that the volume of hardener in the rows 22 was in correct proportions to provide the most advantageous mix with rows of resin adhesives 20. The proportions of resin to hardener employed were those recommended by the manufacturer. So long as all the hardener remains in rows 22 and all the resin adhesive in rows 20 there is no curing or chemical action of the resin adhesive, but when the inner skin sheet is attached in abutting relationship to the outer skin sheet 12 the rows 20 and 22 initially form a cross hatch pattern as shown in FIG. 4 and intermix into the bare metal spaces 24 as a mixture of resin adhesive and hardener. Although the intermixing of the resin adhesive and hardener is not completely homogeneous it does provide isolated areas of a proper mixture joining the interfaces of the skin sheets and sufficient hardener is present in the joint to set or cure the resin adhesive.

One of the requirements in automotive production dictates that two panels to be joined must be seated before a joint is made, thus, eliminating any possibility that instantaneous acting adhesive such as contact adhesives be employed. Further, the strength requirements for acceptable automobile production usually demand that the higher strength adhesives, such as the well known epoxies, be employed. Conventional production lines for assembling sheet metal stampings move from station to station at operating rates up to 800 parts per hour. Conventional pre-mixed epoxy resins either set so fast that they cannot be spread on the interface of the sheets and the sheets pressed together or the pre-mix resins set so slow that thousands of jig fixtures are required to hold the metal stampings in place while the resins cure.

It was found that several epoxies could be employed by separating the hardener from the resin adhesive in the present manner illustrated. The assembly of the two panels could be properly positioned at a standard type work station initiating a rapid curing action between the adhesive and hardener which would set in less than one minute sufficiently hard and with sufficient strength to hold the metal stampings 12 and 14 in an exact and predetermined mating relationship. It was further found that the joined panels had sufficient time to cure or set all the adhesive at the interface before any handling or additional operations would take place, thus allowing a loose fit between sheets 12 and 14 filled by uncured resin adhesive. The resulting panel was free of welding imperfections and ready for paint without further finishing.

While numerous well known epoxy resins and catalyst hardeners could be employed, a series of Mereco Adhesives (modified bis-phenol epichlorohydrin) sold as X–305 series by the Metachem Resin Corporation, provide a resin adhesive which will set in less than one minute and cure in several minutes. Adhesives of this type are described in the "Handbook of Adhesives," Reinhold Pub. Corp., July 1962.

Fast setting epoxy resins are presently more expensive than other types of adhesives, and fast curing epoxy resins are usually not as strong as the conventional slow curing epoxy resins. Therefore, as an economic expedient and modification of the present invention it has been found advantageous in some instances to apply the rows of resin adhesive 20, such a bisphenol A resin with a reactive hardener such as an aliphatic polyamine, diethylenetriamine, so that the adhesive would be slow curing at normal temperatures, and a catalytic hardener 22 such as one of the Lewis acids, boron trifluoride, so that when the panels are joined the catalytic hardener 22 will cause a fast cure of a weaker resin that will hold the pieces while the slower curing resin sets to provide a stronger resin for final strength of the joint. Thus, the faster catalytic cured resin provides the initial holding to eliminate holding fixtures and provides the attaching means while the slower reactive curing resin provides the strength for the final joint. Load supporting side panels, roof panels and underframes can be made stronger than welded panels by making full adhesive joints.

As an example, in the hood 10 illustrated it is possible to apply both thixotropic agent and a slight amount of hardener to the rows of resin adhesive 20 and further to apply a self-curing pre-mix resin to other areas of the mating skin sheets. When the two skin sheets are joined the mixture of hardener and adhesive which flows into the metal areas 24 cures very fast. The unmixed resin adhesive in the rows 20 cures shortly thereafter and the areas having the pre-mix slow curing epoxy resin cure over a term of hours, thus providing a maximum strength joint.

While several embodiments of the present invention have been shown and described, it is apparent that patterns other than rows may be employed to cause the resin adhesive to mix with a hardener when the two sheets are joined to start a rapid curing action.

Other patterns will suggest themselves to those skilled in the art to accomplish the novel result. It is accordingly desired that the appended claims be given a broad interpretation commensurate with the scope of the invention.

I claim:

1. A method of adhesive bonding two workpieces together comprising: mixing a liquid epoxy resin, a slow curing reactive hardener and a thixotropic agent for providing a slow self-curing resin mix resistant to flow; mixing a compatible liquid epoxy resin catalytic hardener with a thixotropic agent to form a hardener resistant to flow; applying said self-curing resin mix to a first workpiece in a spaced apart pattern leaving part of the workpiece exposed; applying said catalytic hardener to a second workpiece in a spaced apart pattern leaving part of the workpiece exposed; combining said workpieces together so that said resin mix and said catalytic hardener are intermixed for rapid curing and flow onto the exposed part of said workpieces, thereby providing areas of fast curing resin and areas of slow curing resin between said workpieces; holding said workpieces together until the intermixed resin and catalytic hardener has set, releasing said workpieces and allowing said slow self-curing resin on said workpieces to cure.

2. A method as set forth in claim 1 which includes the further step of spreading a second slower self-curing epoxy resin adhesive on one of said workpieces at a point remote from said pattern before pressing said workpieces together for providing a third curing rate epoxy resin for bonding said workpieces.

3. A method of adhesive bonding two workpieces together so that the adhesive cures in two distinct time periods comprising, mixing a liquid epoxy resin with a compatible slow curing reactive liquid hardener to provide a liquid slow curing epoxy resin which cures in several hours, spreading said slow curing resin on a first workpiece, spreading a liquid catalytic hardener compatible with said resin on a second workpiece adapted to cure said resin in several minutes, combining said workpieces together so that said catalytic hardener partially mechanically mixes with said slow curing resin to provide therein areas of fast curing resin and areas of slow curing resin between said workpieces, holding said workpieces together to allow said areas of fast curing resin to set, and releasing said hold on said workpieces permitting said fast curing resin to hold said workpieces together while said slow curing resin sets.

4. A method of adhesive bonding comprising, preparing a liquid resin with reactive hardener to cause slow curing at room temperature, spreading said liquid resin mix as a plurality of rows in a first axial direction upon a first workpiece, spreading a catalytic liquid hardener as a plurality of rows in a direction approximately normal to said first axial direction upon a second workpiece, pressing said first and said second workpiece together so that the rows of resin mix and catalytic hardener mechanically intermix and form a fast curing resin between said rows, and maintaining said first and said second workpieces in abutting relationship until the mixture between rows has set as an adhesive bond to hold said first and said second workpieces together while said slower curing mix cures.

References Cited

UNITED STATES PATENTS

| | | | |
|---|---|---|---|
| Re. 22,842 | 2/1947 | Hill | 156—470 XR |
| 2,651,589 | 9/1953 | Shokal et al. | 156—310 |

ROBERT F. BURNETT, *Primary Examiner.*

R. H. CRISS, *Assistant Examiner.*